United States Patent [19]

Langdon

[11] 4,352,693

[45] Oct. 5, 1982

[54] CAPSULES CONTAINING CEMENTITIOUS COMPOSITIONS

[76] Inventor: Michael Langdon, P.O. Box 329, 162 Drakensberg Rd., Rondebult, Germiston 1423, Transvaal, South Africa

[21] Appl. No.: 228,854

[22] Filed: Jan. 27, 1981

[30] Foreign Application Priority Data

Jan. 29, 1980 [GB] United Kingdom ............... 8002941

[51] Int. Cl.$^3$ ............................................... C04B 7/32
[52] U.S. Cl. .................................. 106/104; 206/119; 206/524.1; 206/525; 405/259; 405/260; 405/261
[58] Field of Search ............... 106/90, 104; 206/524.1, 206/525; 405/259, 260, 261, 266

[56] References Cited

U.S. PATENT DOCUMENTS 3,826,665  7/1974  Hovasse et al. .................... 106/104
4,126,609  11/1978  Tomic ................................ 405/260

*Primary Examiner*—James Poer
*Attorney, Agent, or Firm*—Caesar, Rivise, Bernstein & Cohen, Ltd.

[57] ABSTRACT

A capsule for use in anchoring contains as dry ingredients a so-called high alumina cement, a set retarding agent and at least one water-soluble lithium salt. The capsule has a perforated wall and in use is wetted in water to form a self-setting anchoring composition which has a controlled initial setting time followed by an acceptable final setting time after a short interval.

19 Claims, No Drawings

CAPSULES CONTAINING CEMENTITIOUS COMPOSITIONS

The invention relates to capsules containing cementitious compositions for use in the anchoring of anchor elements, such as bolts and dowels in underground conditions especially in mines or in civil engineering.

Anchor elements are usually anchored in drill holes by cementitious or resinous compositions. The use of a cementitious composition is popular because the material is relatively cheap and good results can be achieved by unskilled labour with little supervision. These compositions tend to set slowly and then achieve a high strength. In contrast, resinous compositions set very quickly, often in under an hour, but mixing is skilled and workers must be supervised. It is known to present both compositions in rupturable containers, so-called cartridges or capsules. For convenience we shall call these containers capsules. Capsules containing the interactive components of a resinous composition are popular because the relative proportions of the ingredients are predetermined. It has been proposed to provide a capsule containing a dry cementitious composition in a capsule with walls adapted to allow water into the capsule when immersed in water and one especially advantageous form of that capsule is described and claimed in our co-pending Application No. PCT/GB 79/00080 (CBP 103/4/4A/5).

A problem has arisen with cementitious compositions based on Portland cement in that the failure to achieve a high early strength has proved to be an inconvenience in underground situations. It is known that chemical accelerators can be added to high alumina cement to give very high early strengths but the setting times of such mixtures are erratic and therefore unreliable. Moreover the use of high alumina cement is usually in refractory applications, e.g. linings for furnaces. We have now discovered that the use of a high alumina cement composition containing certain accelerator systems in an anchoring capsule of the type defined in our co-pending Application is especially advantageous.

According to one aspect of the invention there is provided an anchoring capsule comprising a container having a plurality of holes whereby when the capsule is immersed in a liquid component the liquid passes through the holes into the container there to interact with a dry solid component in the container to form the self-setting composition, and including means to reduce loss of the self-setting composition via the holes when the capsule is immersed in the liquid component, in which the dry self-setting composition in the container is a cementitious mixture comprising a high alumina cement, a set retarding agent comprising an organic acid component selected from a group of hydroxy carboxylic acids and alkali metal salts and esters thereof, and at least one water soluble lithium derivative.

While we do not wish the invention to be limited in any way by the following theory, it is believed that in the invention the lithium ion gives a rapid gain in strength after initial set through the composition. In this way the composition is caused to achieve a controlled acceptable initial setting time followed by an acceptable final setting time after a controlled short interval.

The cementitious material in the composition is so-called high alumina cement. This material is known under a variety of names in different countries, for example "Cement Fondue" and alumina cement or super alumina cement. The content of alumina in the cement varies from country to country, sometimes being as low as 37% and other times being over 77%. The invention is applicable to all such high alumina cements.

The organic acid component is preferably selected from citric, tartaric, gluconic acids; carbohydrate salts, glycols, glycerine, sugars and the like.

The lithium derivative is preferably lithium carbonate, lithium sulphate or lithium hydroxide. Any salt may be used provided it is water soluble and compatible with the other ingredients. More than one derivative may be present.

Preferably the organic acid component and the lithium derivative are present in substantially equal proportions by weight.

The composition may include other ingredients. Sand and aggregate or other fillers may be added, as appropriate, e.g. to reduce cost and shrinkage and control water uptake. So too may water reducing agents, expanding agents, surfactants, colourants, latex emulsions, anti-foaming agents and plasticisers. Other accelerators may be present provided that they enhance and do not detract from the effect of the organic acid and lithium derivative; an example is sodium carbonate or sodium sulphate.

Two types of additives are especially advantageous. A thixotropic or thickening agent is present if a loss of grout composition is to be minimised, a point especially important in overhead or fissured rock applications. Preferred thixotropic agents are polymeric or montmorillonite type clays and cellulose ethers and bentonite are prime examples. The content of the thixotropic agent will depend on its molecular weight, in general a cellulose ether having a molecular weight of about 250,000 will be present in about 0.3% by weight. The thixotropic agent also partially controls water uptake. A lightweight filler is most preferably present to increase the water uptake of the composition and examples include hollow microspheres such as flyash floaters; and perlite or vermiculite.

Preferred compositions comprise, parts by weight:
high alumina cement: 100
citric acid: 0.065
lithium hydroxide: 0.05
thixotropic agent: 0.3 to 2
lightweight filler: 0.5 to 5

The capsule is most preferably according to the disclosure of our above-mentioned co-pending Application. We have discovered by trial and experimentation under field conditions that the dimensions of the capsule are important if the optimum advantages are to be obtained. Most preferably the capsule ranges from 25 to 40 mm in diameter and 200 to 600 mm in length. The dry material in the capsule is preferably compacted to a density at which loss of material when wetted is minimised and a capsule, especially a long one, does not become loose or floppy when wetted. Densities above 1.2, preferably 1.4 are preferred.

The capsules may be used in bore holes ranging from about 36 mm to about 50 mm in diameter. The bore holes may be drilled in the wall or roof of a coal mine, gold mine, iron ore mine, quarry or civil engineering structures. It is an especial advantage of the invention that the annular clearance between the capsule and the hole diameter can be large, e.g. a capsule 36 mm in diameter can readily be used in a 43 mm diameter hole.

The invention further includes as another aspect a method of anchoring an anchor element in a bore hole, comprising wetting a capsule as disclosed herein in a water: cement ratio of below 0.4:1, locating the wetted capsule in the bore hole, urging an anchor element in the bore hole to rupture the wall of the capsule to release the wetted self-setting composition to set to anchor the element in the bore hole.

The anchor element may be of metal, wood or plastic. Typically metal anchor elements include rebar bolts, and bars; a hardwood dowel is an example of a wood anchor element.

It is preferred that the dry composition be set by potable water. Such water is often not available and in some mines oily water of the type used in hydraulic machinery is the only water readily available. It is a surprising advantage of the invention that such water can be used to set the dry cement composition of the invention. There can however be a slight delay in the setting rate. In addition in certain mines the available water can be hot, often 35° to 40° C., and most preferably the dry cementitious composition of the invention is adapted to be set by water at a temperature in excess of 20° C. Irrespective of the temperature of the water the composition disclosed herein is predetermined for a correct water:cement ratio so that improper mixing is minimised. For high alumina cements the water:cement ratio is below 0.4:1, preferably 0.3:1.

In the mining of coal it is customary to insert many wooden dowels into the face of coal being cut to prevent the coal coming away in large lumps. In one technique known as tandem dowelling, the dowels are each about 2 meters long and two such dowels are inserted in tandem into the depth of the face so giving about 4 meters length of dowelling, equivalent to a week's work. When the dowels are secured by capsules containing a self-setting resinous composition the resin sets quickly and as a result it can be difficult to align and secure one dowel in tandem after the other. Often the second dowel cannot go the full length and some has to be cut off or parts of the installation tooling can become stuck together. It is an advantage of this invention that because the cementitious composition in the capsule does not set so speedily parts may be removed and adjustments to the dowel can be made to align one dowel with respect to the other.

The invention includes an anchor element anchored by the method.

In order that the invention may be better understood it will now be described with reference to the following examples in which all parts are by weight.

EXAMPLE I

The purpose of this example is to show the effect of the two additives on the high alumina cement. Mixes were made up of the 14 compositions in Table I below. Each mix was made up of high alumina cement with additives as specified in the Table and grouts were made by adding water in a water:cement ratio of 0.3:1. The grouts were mixed in a Hobart mixer for 5 minutes and then poured into containers. Setting times were determined by the Proctor penetrometer as described in ASTMC 40 3 and BS5075:I:75 sections CI.2.4 and CI.2.5, respectively. Ambient temperature was 20° C.

The results are also shown in Table I from which it can be seen that the sole presence of citric acid as organic retarding agent prolongs the setting time to an unacceptable extent whereas the sole presence of lithium hydroxide accelerates it to a marked extent. Having both additives present in different ratios within a capsule enables one to achieve reasonable initial setting times followed shortly by the final setting times, indicating an associated increase in the rate of gain of early strength.

TABLE I

| MIX | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| citric acid content, weight % based on HAC (C) | 0 | 0.05 | 0.10 | 0.20 | 0.05 | 0.20 | 0.10 | 0.20 | 0.10 | 0.05 | 0.10 | 0.05 | 0.05 | 0 |
| content of powdered lithium hydroxide monohydrate, weight % based on HAC (L) | 0 | 0 | 0.01 | 0.03 | 0.01 | 0.05 | 0.03 | 0.07 | 0.05 | 0.03 | 0.07 | 0.05 | 0.07 | 0.05 |
| weight ratio C:L | — | — | 100:10 | 100:15 | 100:20 | 100:25 | 100:30 | 100:35 | 100:50 | 100:60 | 100:70 | 100:100 | 100:140 | — |
| setting time (initial) (mins) | 249 | 466 | 168 | 85 | 45 | 73 | 51 | 49 | 51 | 25 | 35 | 17 | 11 | <5 |
| setting time (final) | 260 | 477 | 200 | 92 | 85 | 86 | 60 | 60 | 60 | 34 | 37 | 24 | 14 | <10 |

EXAMPLE II

A capsule according to our co-pending Application No. PCT/GB 79/00080 (CBP 103/4/4A/5) and having walls perforated with holes each 0.7 mm diameter and present in a density of 32 holes per sq. cm. was filled with a dry cementitious composition comprising:

high alumina cement: 100
citric acid: 0.065
lithium hydroxide: 0.05
polyethylene oxide: 0.05
cellulose ether: 0.3

The material was compacted to a density of about 1.48 gm/cc and the capsule was 32 mm diameter and 250 mm long.

Bore holes were drilled at an angle of about 30° to the horizontal in the cutting face of a coal mine. The holes were dry. The holes were 43 mm diameter and 1.8 m long. Capsules made as above were immersed in water for about 4 minutes so giving a capsule containing about 200 ml of wet grout. The capsules were removed and stemmed into the hole, one at a time using a stemming rod. A dowel was then anchored in the back of the hole on the end of an adaptor on an auger. The auger was withdrawn and it was noticed that this was done easily which is often not the case when using resin anchor capsules. The adaptor was cleaned in water and used to anchor another dowel in tandem to the first. The job was done by a single operator who found the work especially effective and easy.

EXAMPLE III

The method of Example II was repeated to determine the bond length in meters using different diameters of anchor elements in bore hole diameters. The results are shown in Table II below.

TABLE II

| Bolt/dowel diameter | Average hole diameter | | |
|---|---|---|---|
| | 36 mm | 43 mm | 45 mm |
| 20 mm | 0.28 | 0.18 | 0.16 |
| 25 mm | 0.38 | 0.21 | 0.18 |
| 32 mm | 0.74 | 0.31 | 0.25 |
| 36 mm | | 0.46 | 0.35 |

EXAMPLE IV

Tests were made to establish the compressive strength of the cementitious composition in the capsules of Example II. Typical cube results using 71 mm cubes are shown in Table III below.

TABLE III

| Time after mixing | Cube strength |
|---|---|
| 1 hour | 15 N/mm$^2$ |
| 6 hours | 25 N/mm$^2$ |
| 24 hours | 30 N/mm$^2$ |
| 28 days | 40 N/mm$^2$ |

Capsules were used to anchor dowels, National Coal Board type Keuring Ramin timber and bar, high yield rebar to British Standard BS 4449, and the pull out strengths obtained are shown in Table IV below. These results show that when using the capsules of the invention high pull out strengths are obtained very quickly, even when there is a wide annular gap between the diameter of the capsule and the bar or the capsule and the bar hole.

TABLE IV

| Conditions | Time after insertion (hours) | Pull out load (tonnes) | Mode of failure |
|---|---|---|---|
| 36 mm diameter hole in concrete using 25 mm rebar & 450 cm bond length | 3 | 13 | Grout to Concrete |
| | 4 | 20 | Bar to Grout |
| | 6¼ | 24 | Bar failure |
| 43 mm diameter hole in millstone grit using 20 mm diameter rebar & 200 cm bond length | 4¼ | 14 | Bar failure |
| | 6¼ | 15 | Bar failure |
| 43 mm diameter hole in millstone grit using 25 mm diameter rebar & 200 cm bond length | 2¼ | 18 | Bar to Grout |
| | 2¾ | 17 | Bar to Grout |
| | 3¾ | 23 | Bar failure |
| | 4¼ | 23 | Bar failure |
| | 5¼ | 23 | Bar failure |
| | 6¼ | 25 | Bar failure |
| 43 mm diameter hole in millstone grit using 36 mm diameter wood dowel & 175 cm bond length | 2 | 5 | Dowel to Grout |
| | 4 | 7 | Dowel to Grout |
| | 4¼ | 10 | Dowel to Grout |

Without further elaboration the foregoing will so fully illustrate my invention that others may, by applying current or future knowledge, readily adapt the same for use under various conditions of service.

I claim:

1. An anchoring capsule for use in anchoring, comprising a container, a dry self-setting water activatable solid composition in said container, said container having a plurality of holes whereby when the capsule is immersed in water the water passes through the holes into the container there to interact with said dry solid component in the container to form the anchoring self-setting composition, said container including means to reduce loss of the self-setting composition via the holes when the capsule is immersed in the water, and wherein the dry self-setting composition in said container is a cementitious mixture comprising a high alumina cement, said dry self-setting composition including both an organic acid component selected from the group consisting of hydroxy carboxylic acids and alkali metal salts and esters thereof, and at least one water soluble lithium derivative, said organic acid component and said lithium derivative being present in substantially equal proportions by weight, and in which there is a concentration of 0.05 parts of the lithium derivative to 100 parts of dry self-setting composition which is sufficient to cause the self-setting composition to achieve a high early strength in the form of a controlled initial setting time followed by a final setting time to give a final strength similar to the high initial strength whereby an element may be anchored in the set anchoring composition.

2. A capsule according to claim 1, with the content of alumina in the high alumina cement ranging from 37% to 77%.

3. A capsule according to claim 1, with the organic component being selected from the group consisting of citric, tartaric, gluconic acids, carbohydrate salts, glycols, glycerine, sugars, hydroxy carboxylic acids and alkali metal salts and esters thereof.

4. A capsule according to claim 1, with the lithium derivative being lithium carbonate, lithium sulphate or lithium hydroxide.

5. A capsule according to claim 1, with the additional presence of any or all of sand and aggregate or other fillers, water reducing agents, expanding agents, surfactants, colourants, latex emulsions, anti-foaming agents and plasticisers.

6. A capsule according to claim 1, with sodium carbonate or sodium sulphate being present as secondary accelerators.

7. A capsule according to claim 1, with a thixotropic or thickening agent being present.

8. A capsule according to claim 1, with a lightweight filler being present to increase the water uptake of the composition.

9. A capsule according to claim 8, with the lightweight filler comprising hollow microspheres and perlite or vermiculite.

10. A capsule according to claim 1, with the composition comprising, parts by weight:
high alumina cement: 100
citric acid: 0.065
lithium hydroxide: 0.05
thixotropic agent: 0.3 to 2
lightweight filler: 0.5 to 5

11. A capsule according to claim 1, with the composition being compacted to a density above 1.2.

12. A capsule according to claim 1, with the capsule ranging from 25 to 40 mm in diameter and 200 to 600 mm in length.

13. A method of anchoring an anchor element in a bore hole by means of a rupturable capsule containing a dry cementitious composition, said method comprising wetting the capsule of claim 1 in a water:cement ratio of below 0.4:1, locating the wetted capsule in the bore hole, and urging an anchor element in the bore hole to rupture the wall of the capsule to release the wetted self-setting composition to set to anchor the element in the bore hole.

14. A method according to claim 13, with the anchor element being of metal, wood or plastic.

15. A method according to claim 13, with the water being potable water or oily water of the type used in hydraulic mining machinery.

16. A method according to claim 13, with the water:cement ratio being 0.3:1.

17. A method according to claim 13, with there being a large annular clearance between the capsule and the bore wall.

18. A method according to claim 17, with a 36 mm capsule is used in a 43 mm diameter hole.

19. An anchor element anchored by a method according to claim 13.

* * * * *